Figure 2:
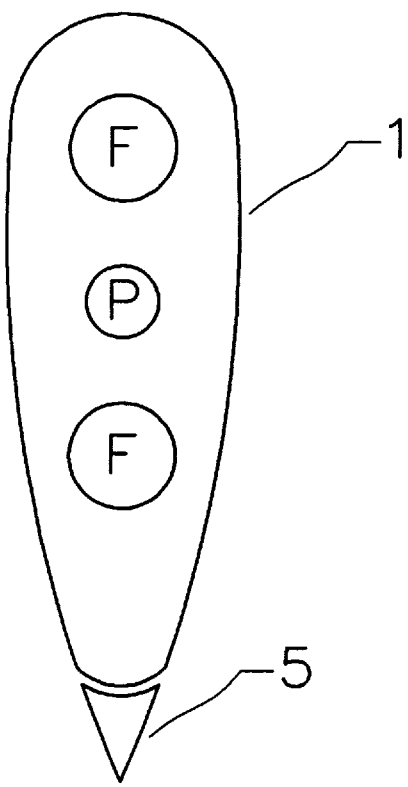

United States Patent [19]

Blanchette

[11] Patent Number: 5,839,690
[45] Date of Patent: Nov. 24, 1998

[54] INERTIAL ACCELERATION AIRCRAFT

[76] Inventor: David John Blanchette, P.O. Box 1839 Betts St. NE., Alburquerque, N. Mex. 87112

[21] Appl. No.: 697,354

[22] Filed: Feb. 22, 1996

Related U.S. Application Data

[63] Continuation-in-part of Ser. No. 535,915, Jun. 11, 1990, abandoned.

[51] Int. Cl.⁶ ............................. B64C 27/00; B64C 39/06
[52] U.S. Cl. ......................... 244/6; 244/34 A; 244/17.11
[58] Field of Search ............................... 244/6, 7 A, 7 B, 244/7 C, 34 A, 39, 17.11

[56] References Cited

U.S. PATENT DOCUMENTS

| | | | |
|---|---|---|---|
| 828,867 | 8/1906 | Stoltenberg | 416/60 |
| 2,328,786 | 9/1943 | Crowder | 244/7 B |
| 2,479,125 | 8/1949 | Leonard | 244/7 B |
| 2,633,922 | 4/1953 | Svenson | 416/21 |
| 2,807,428 | 9/1957 | Wibault | 244/23 C |
| 2,823,875 | 2/1958 | Peterson | 244/7 A |
| 2,866,608 | 12/1958 | Leonard | 244/7 B |
| 2,874,920 | 2/1959 | Mallinckrodt | 244/34 A |
| 2,918,229 | 12/1959 | Lippisch | 244/34 A |
| 2,941,600 | 6/1960 | Koning et al. | 416/22 |
| 3,251,421 | 5/1966 | Bracey | 416/22 |
| 3,356,315 | 12/1967 | Kolodziej | 244/7 B |
| 3,514,053 | 5/1970 | McGuinness | 244/23 C |
| 3,838,835 | 10/1974 | Kling | 244/23 C |
| 3,946,970 | 3/1976 | Blankenship | 244/23 C |
| 4,195,800 | 4/1980 | Wallace | 244/7 A |
| 4,433,819 | 2/1984 | Carrington | 244/12.2 |

FOREIGN PATENT DOCUMENTS

| | | | |
|---|---|---|---|
| 514563 | 5/1954 | Belgium | 244/7 A |
| 522266 | 3/1956 | Canada | 244/34 A |
| 1149496 | 12/1957 | France | 244/34 A |
| 1225791 | 7/1960 | France | 244/7 B |

*Primary Examiner*—Galen L. Barefoot

[57] ABSTRACT

An aircraft structured particularly, as a whole to improve its capacity for accelerating by the means of transforming stored motion of mass into translocational motion of the aircraft; the aircraft is structured particularly, as a whole, to improve its capacities for storing motion of mass and for transforming stored motion of mass into translocational motion of itself; motion preferrably in stored as orbital motion of the aircraft's parts; the stored orbital motion preferrably is transformed by aerodynamic action into translocational motion of the aircraft; the means for storing orbital motion preferrably consists of a rotor, within the periphery of which are situated the aircraft's sustaining, propelling, motion transformation, fuel containment, and landing means; situated within said appended to a generally nonrotating fuselage are, respectively, a pilot area and a means for controlling the source of translocational flight; the preferred motion transforming means comprises a plurality of rotor blades, each of which has a longitudinal axis aligned generally with a radius of the rotor axis and of which is tiltable about a longitudinal axis, and effects the transformation with an appropriate rate collective alteration of the blade lateral axes from coincident with the blade orbital planer to the perpendiculars thereto, which alternation aerodynamically transforms the rotation of the rotor into axial motion thereof; the spin axes of the spinning mechanisms of the propulsion means parallel the rotor axis; appended to each propulsion means is a thrust redirecting means which enables the former to propel the rotor both rotationally and axially.

7 Claims, 2 Drawing Sheets

FIGURE 1

INERTIAL ACCELERATION AIRCRAFT

This application is a continuation in part of earlier application Ser. No. 07/535,915, now abandoned.

The present invention is of an aircraft thats constructed such as to accumulate annular motion and to accelerate by transforming that annular motion into translocational motion of the aircraft. The aircraft is able to accelerate at a better rate then prior art aircraft can.

The aircraft's construction and manner of acceleration are such that the acceleration may include a transition from a nontranslocational flight thats sustained by annularly moving wings to a translocational flight thats sustained by a fixed wing. The transition is more effective and efficient than are transitions from nontranslocational to translocational flight that are possible in prior art aircraft.

The aircraft's construction is such that the aircraft may accumulate while flying nontranslocationally an annular motion thats equivalent to the motion that the aircraft has during flight at a large translocational velocity. The construction also is such that the aircraft may accelerate from the just stated nontranslocational flight to a flight thats at the just stated large translocational velocity by transforming the just stated annular motion into the motion thats present as a part of the flight at the large translocational velocity.

The construction is such that the aircraft is able to effect aerodynamic force thats able to curve the accumulated annular motion into motion of translocational motion of the aircraft. The construction therefore is such that the aircraft is able to accelerate through a large velocity change by curving by aerodynamic means motion thats been accumulated prior to the acceleration.

The limits upon the aircraft's acceleration, therefore, are those that are upon accumulation of annular motion and upon curvature of motion by aerodynamic means. They're less limiting than are the limits that are upon acceleration by application of engine thrust against the inertia of an aircraft's mass.

Prior art aircraft accelerate by applying engine thrust directly against the inertia of aircraft mass. The accelerational rate of a prior art aircraft, therefore, is the rate at which engine thrust is able to overcome the inertia of aircraft mass. Its limited, therefore, by the aircraft's thrust to weight ratio. A few prior art aircraft possibly may argment acceleration slight by transforming slight quantities of accumulated rotary motion into motion thats associated with translocational aircraft motion, but if there are any such augmentations they're too slight to significantly influence accelerational performance. Such augmentations, if there are any; also are inadvertant; there is no prior art aircraft thats constructed purposefully such as to accelerate by transforming accumulated motion. In the prior art its considered to be an elemental truth that an aircraft's accelerational capability is determined by its thrust to weight ratio.

The present invention, therefore, improves the aeronautical arts by providing an aircraft the acceleration of which is not limited by thrust to weight rates, and that, instead, is limited only by the less restrictive limits that are upon accumulation of annular motion and aerodynamic curing of accumulated annular motion into motion of translocational aircraft flight.

The aircraft also is constructed such that coincidently with its acceleration it may transition from a nontranslocational thats sustained by annularly moving wings to a translocational flight thats sustained by a fixed wing. The construction is such that the annular motion thats been accumulated previously to the acceleration and transition can serve as the source of the translocational aircraft motion that must originate as a part of the transition, and, as well, as the source of the aircraft's sustenance during the transition's course.

The construction is such that the transition from non-translocational to translocational flight is effected by the curving of initially annular motion that also effects the aircraft's acceleration. The construction, accordingly, is such that the transition may proceed as quickly as annular motion can be curved into motion of translocational aircraft motion.

In the prior art a transition from nontranslocational flight to flight thats sustained by a fixed wing must include an accumulation of motion of translocational flight at a velocity sufficient to enable sustenance by a fixed wing. That motion can't be brought forth by transformation of previously accumulated motion because no prior art aircraft can accumulate enough motion prior to its transition and because the motion that a prior art aircraft can accumulate prior to its transition must for the most part be kept within its original form wherein its used to sustain the aircraft until the aircraft's attainment of fixed wing flying velocity.

As a result, in a prior art transition the aircraft's engines must supply over the transition's course both the power that effects the aircraft's accumulation of motion of translocational flight and the power that effects the aircraft's sustenance until its attainment of fixed wing flying velocity. The limitations upon engine power and the quantity of engine power needed to sustain an aircraft by other than a fixed wing are such that over the course of a prior art transition most of the engine power available must be applied to the task of sustenance. Therefore, only a rather small portion of the engine power is used to increase the aircraft's translocational velocity. A prior art transition therefore proceeds rather slowly, and only as fast as a rather small portion of the aircraft's engine power can increase the aircraft's translocational velocity to fixed wing flying velocity. A prior art transition accordingly is somewhat inefficient in its usage of engine power. A prior art transition also can be rather dangerous, because engine failure within the midst of the transition can leave the aircraft without a fully effective means of sustenance.

Accordingly, the present invention improves the art of aircraft that transition from nontranslocational to fixed wing flight by providing an aircraft that may so transition in less time than has been necessary previously, that may use engine power more efficiently during the transition, and that may transition more safely than previously has been possible.

An aircraft of the invention is constructed such as to compose an annular the axis of which coincides with the aircraft longitudinal axis. The construction is such that the aircraft accumulates its annular motion by revolving about its longitudinal axis.

Preferably, the aircraft is constructed such as to have the greatest annular motion accumulation capacity attainable within its builder's budget and within the gross weight that the aircraft is to have. Preferably, thats attained by constructing the aircraft such that its annulus' radias and its revolution rate capacity are as are attainable within its builder's budget and the gross weight that the aircraft is to have.

The aircraft is constructed such that its transformation of accumulation annular motion into motion of translocational aircraft flight and its resulting acceleration and transition to fixed wing flight are effected by an aerodynamic curving of the accumulated annular motion into motion thats essentially linear, parallelling of the longitudinal axis, and the translocational flight of the aircraft. Preferably, the aircraft's constructed such that its capacity for such aerodynamic curving of motion is the greatest attainable within its builder's budget and the desired aircraft gross weight.

The construction of the aircraft is such that the aircraft incorporates a means for imparting motion into the annulus that the aircraft forms. That means is constructed such that it may effect, alternatively, revolution of the annulus about its axis, translocational motion of the annulus along its axis, or both. The means accordingly is constructed such as to be capable of propelling the annulus annularly, axially, or simultaneously annularly and axially.

The aircraft incorporates means for controlling its orientation and course during its flight. It also incorporates means for controlling the operations of each of its various elements.

The preferred embodiment of the aircraft comprises an annular wing, a plurality of radial wings, a plurality of engine-vectoring unit combinations, a plurality of ailerons of the annular wing, a fuel containment means, a landing gear, and means for controlling the operations of the radial wings, the engine-vectoring unit combinations, the ailerons, and the landing gear.

The annular wing forms a part of the annular that the aircraft forms. Its axis coincides with the aircraft longitudinal axis. The annular wing is constructed such as to be capable of sustaining the aircraft during post-accelerational, translocational flight. The annular wing is constructed such that it may serve as a mount for the aircraft's other elements, and the aircraft is constructed such that the annular wing does so serve. The annular wing is constructed such that it may absorb and contain the centrifugal forces that happen during and as a result of the aircraft's revolution about its longitudinal axis, and it serves as the aircraft's means for containing those forces.

The radial wings are located within an annular area that surrounds and is of slightly greater radias than the annular wing. They're positioned relatively to the annular wing such as to radiate outwardly from its and such that a longitudinal axis of each occurs along a radial of the aircraft longitudinal axis. The radial wings therefore move annularly about the aircraft longitudinal axis when the aircraft revolves about its longitudinal axis. The radial wings are of such size that they may as they move in such an annular manner effect enough aerodynamic force to sustain the aircraft. The radial wings are constructed such that the ratio of their lengths to the radius of the annular wing is as small as practical; the reasons therefore are presented within the detailed description of the aircraft.

Each radial wing is pitch adjustable about an axis thats longitudinal with respect to the radial wing and radial with respect to the aircraft longitudinal axis. The means for controlling radial wing pitch is constructed such as to control the radial wing pitches collectively.

The radial wings are the aircraft's means for curing annular motion of aircraft revolution into linear motion of translocational aircraft flight. Accordingly, the radial wings are the aircraft's means for effecting the aerodynamic forces that effect its accelerational and transitional flight.

The construction of the radial wings is such that they're able to effect the just described curing of motion by pitching at an appropriate rate from a pitch that has aligned their chordlines approximately with a plane along which they've been moving and thats normal to the aircraft longitudinal axis to a pitch that parallels their chordlines with the aircraft longitudinal axis. The pitching action is described in more detail within the detail description's of the aircraft's structure and operation.

The radial wings are positioned relatively to the rest of the aircraft's elements such as to reside upon a plane thats normal to the aircraft longitudinal axis and transitting of the center of the gyroscopic effect that occurs during and due to the aircraft's revolution about its longitudinal axis. That minimizes the tendency of the aerodynamic force effected by the radial wings to process the aircraft longitudinal axis and thereby improves the aircraft's orientational stability.

The aircraft preferably has two engines, and the two preferably are secured rigidly to diametrically opposed portions of the annular wing. Each engine is partially embedded within the annular wing. Each engine is oriented relatively to the annular wing such as to parallel its longitudinal axis with the aircraft longitudinal axis. Each engine preferably is an axial flow turbojet.

The orientation of each engine is such that the spin axis of its turbines parallels to aircraft longitudinal axis. The turbine spin axis therefore also parallels the axis of aircraft revolution during the aircraft's revolution about its longitudinal axis. The engine orientation, therefore, is such that revolution of the aircraft about its longitudinal axis doens't cause reorientation of the spin axis of the turbines. Accordingly, the engine orientation is such that revolution of the aircraft about its longitudinal axis doesn't effect the sorts of gyroscopic reactional forces that would result from reorientation of the turbine spin axis.

Since each engine is an axial flow turbojet the longitudinal axis of which parallels the aircraft longitudinal axis, its thrust when not vectored tends to propel the aircraft along its longitudinal axis. The engine thrusts, therefore, must be vectored appropriately before they can be used to effect revolution of the aircraft about its longitudinal axis.

The inlet areas of the engines are shaped such as permit air to enter efficiently during both flight of the aircraft along its longitudinal axis and revolution of this aircraft about its longitudinal axis. Appropriate shaping of the inlets is a matter of application of the ordinary skills of inlet design.

The vectoring needed to enable engine thrust to effect revolution of the aircraft about its longitudinal axis is effected by two vectoring units, one of which is associated with each engine. Each of the vectoring units is secured to its associated engine's aft area. Each is constructed such that is may vector its associated engine's thrust by up to 90° about an axis that transits the vectoring unit and is radial with respect to the aircraft longitudinal axis. Each vectoring unit, therefore, may vector its associated engine's thrust to where it acts tangentially to the annulus that the aircraft composes, and to where it, therefore, effects revolution of the aircraft about its longitudinal axis. Each of the engine-vectoring unit combinations may be an appropriately positioned and oriented version of an engine-vectoring unit combination thats currently in use in prior art aircraft.

The aircraft is constructed such that its center of gravity resides along the aircraft longitudinal axis. Such placement helps to assure smooth aircraft operation during revolution of the aircraft about the aircraft longitudinal axis.

The aircraft also is constructed such as to place its center of gravity relatively to its annular wing such as to assure optional flight performance during translocational flight. The positioning of the gravity center relatively to the annular wing leading and trailing edges is similar to the positioning relative to wing leading and trailing edges used in straight winged aircraft.

Due to the aircraft's annular configuration its center of gravity naturally coincides with the center of the gyroscopic effect that occurs during and due to the aircraft's revolution about its longitudinal axis. Thats advantageous because it helps to assure that gravity's effect upon the aircraft during the aircraft's annular flight doesn't tend to precess the aircraft longitudinal axis. It lets aircraft orientational stability during annular flight be much like that of a gyroscope thats spinning freely in space. Annular flight, in case the meaning is not sufficiently obvious, is flight during which the aircraft is revolving about its longitudinal and is being sustained by its then annularly moving radial wings.

The aircraft's ailerons, fuel containment means, landing gear, and means for controlling the operations of its elements are described in appropriate detail within the detail descriptions of the aircraft's structure and operation.

Accordingly, then, the most general of the objects of the present invention is an improvement of aircraft performance.

A more specific but nevertheless still rather general object is an improvement of aircraft accelerational performance.

A still more specific object is an improvement of aircraft accelerational performance by provision of an aircraft that may accelerate by transforming annular motion thats been accumulated previously to the acceleration into motion of translocational aircraft flight.

A still more specific object is an improvement of aircraft and of aircraft accelerational performance by provision of an aircraft that may accelerate by aerodynamic curing of previously accumulated annular motion into motion of translocational aircraft flight.

Another specific object is an improvement of aircraft and of aircraft accelerational performance by provision of an aircraft the accelerational performance of which is independent of the aircraft's thrust to weight ratio.

An additional rather general object is an improvement of the effectiveness with which an aircraft may transition from a nontranslocational flight to fixed wing flight.

A more specific object that subsidiary to the object just stated is an improvement of the effectiveness with which an aircraft may so transition, by provision of an aircraft that over the transition's course may use accumulated annular motion as its source of both sustenance and motion of translocational flight.

An additional specific object is an improvement of aircraft of the sort that incorporate rotary or annularly moving elements, by provision of an aircraft the center of mass of which coincides substantially with the gyroscopic effect created by its rotary or annularly moving elements, such that the gyroscopic effect may serve effectively as a means or stabilizing the aircraft.

A further specific object is an improvement of aircraft of the sort that incorporate turbine engines that revolve about an axis, by provision of an aircraft the turbines of the engines of which are oriented such as to parallel their spin axes with the axis about which the engines revolve, such that revolution of the engines doesn't reorient the turbine spin axes and, therefore, doesn't create the gyroscopic reactional forces that would result from reorientation of them.

That these and other objects are effected by this invention will become apparent upon consideration of this specification and the accompanying drawings.

Figure 1:
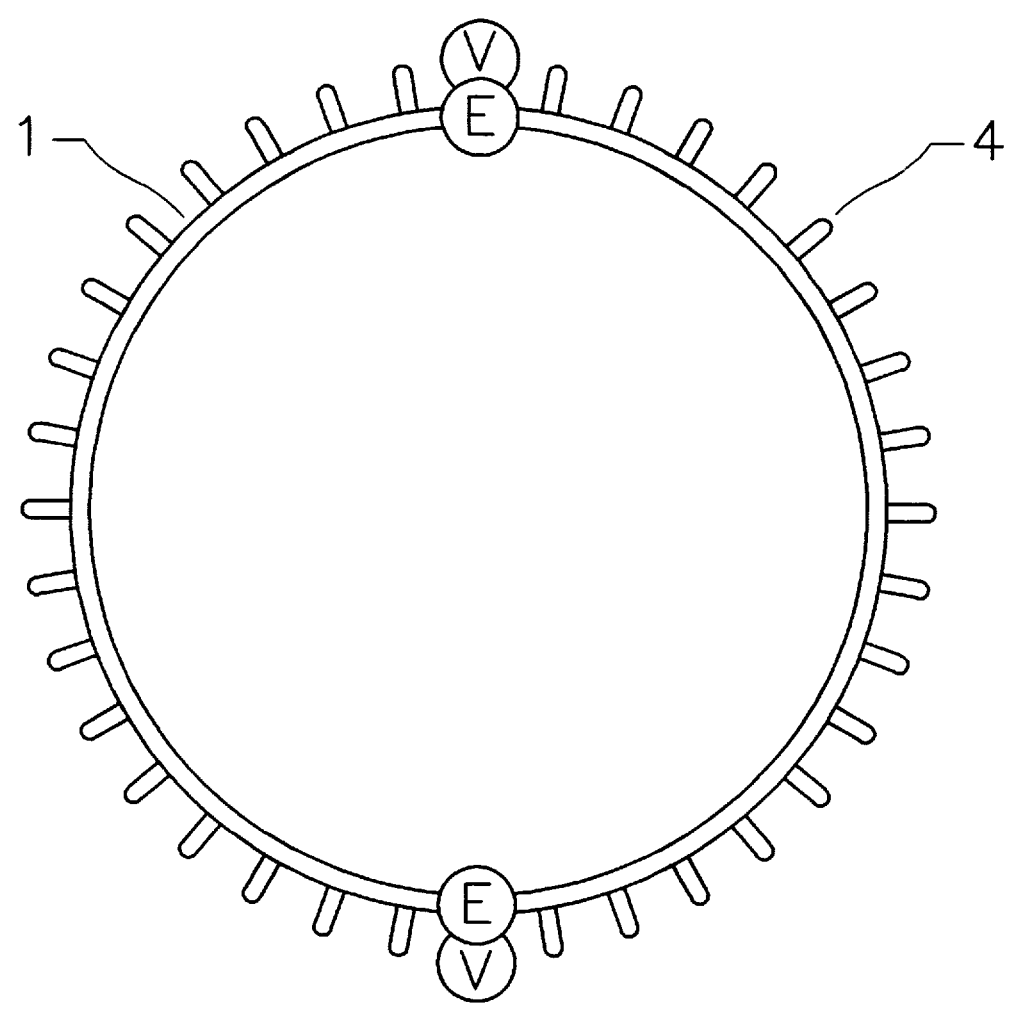

FIG. 1 illustrates the aircraft as viewed from a position that forward of it. The direction of review is along the aircraft longitudinal axis. The radial wings are positioned appropriately for the aircraft's fixed wing flight and therefore show their leading edges.

FIG. 2 presents a cross section of the aircraft's annular wing, taken along a plane thats radial to the aircraft longitudinal axis and transiting of an aileron of the annular wing.

FIG. 2 illustrates the positions relative to one another of the annular wing surface, the aileron surface, two fuel tanks, and the radial wing pitch control means. FIG. 2 doesn't show the annular wing's spar and rib structure.

Referring now to the drawings, the preferred aircraft comprises an annular wing 1, a plurality of radial wings 4, a plurality of engines each of which is represented in FIG. 1 by an encircled "E", in association with each engine a vectoring unit that is FIG. 1 is represented by a "V" thats enclosed by a partial circle, a plurality of ailerons 5 of the annular wing 1, a plurality of fuel tanks a sample one of which is represented in FIG. 2 by an encircled "F", a radial wing pitch control means, represented in FIG. 2 by an encircled "P", a landing gear, not shown, and means, not shown, for controlling the operations of the engines, vectoring units, ailerons, and landing gear.

The annular wing 1 serves well as a frame of reference for the aircraft's axes. The annular wing 1 axis is also the aircraft longitudinal axis. "Forward" with respect to the aircraft, therefore, is along the annular wing 1 axis and in the direction toward which the annular wing 1 leading edge points. "Aftward" is, of course, in the opposite direction.

The annular wing 1 preferably in constructed such as to have the greatest radias attainable within the budget of the aircraft's maker and the gross weight that the aircraft is to have. A greater annular wing 1 radias is preferred because it enables a greater ratio of annular aircraft motion to centrifugal load effected by the annular motion, and, thereby, a greater accumulation of annular motion and a greater accelerational performance. A greater annular wing 1 radias is preferred also because it permits a lesser radial wing 4 length by increasing the annular length over which the radial wing 4 surface area may be distributed. A lesser radial wing 4 length is preferred for reasons that will be presented within the detail description of the radial wings 4.

The annular wing 1 preferably is constructed such as to have the greatest capacity for containment of centrifugal load attainable within the budget of the aircraft's maker and the gross weight that the aircraft is to have. Such capacity is preferred because it increases the aircraft's capacity for accumulating annular motion and, thereby, the aircraft's accelerational performance.

The preferred centrifugal load bearing capacity preferably is attained by incorporating within the annular wing 1 at least one annular spar, not shown, thats constructed such as to have the greatest tensile strength attainable within the budge of the aircraft's maker and the gross weight that the aircraft is to have, and by constructing the annular wing 1 skin such that is also may bear some of the centrifugal load.

Apart from embodying the just described considerations of radias and centrifugal load bearing capacity, the annular wing's 1 construction preferably is similar to the construction of conventional annular wings. The structure accordingly preferably includes such rib and skin structure as is needed to enable the wing's shape and capacity for bearing the aerodynamic loads imposed during tis sustenance of the aircraft.

The annular wing 1 airfoil cross section preferably is symmetrical. A symmetrical cross section lets the annular wing 1 sustain the aircraft effectively and efficiently while at any roll attitude.

Each radial wing 4 is attached to the annular wing 1 and to the annular spar, not shown. Such is the attachment that each radial wing 4 extends radially outwardly from the annular wing 1. The attachment is also such that the radial wing 4 is rotatable relatively to the annular wing 1 and about an axis thats longitudinal with respect to the radial wing 4 and radial with respect to the aircraft longitudinal axis. The attachment, accordingly, is such as to enable radial wing 4 pitch adjustability about the just described axis. A means for attaching an element in a way that enables its rotatability about a described axis can be made with use of only ordinary skill; accordingly, a detail description of the structure of the attachment of radial wing 4 to annular wing 1 will not be provided.

Preferably, the radial wings 4 are distributed substantially equidistantly from one another through the annular area that surrounds the annular wing 1, except that they're not placed coincidently with either of the engines. The placement of the radial wings 4 preferably is such that the axes of the pitch adjustabilities of the individual radial wings 4 reside upon a single plane thats normal to the aircraft longitudinal axis.

Preferably, the construction of the radial wings 4 is such that they're as short along their longitudinal axes as they can be while still together having enough surface area to effect enough aerodynamic force to sustain the aircraft while moving annularly and to effect the aircraft's accelerational flight. The surface area needed to effect the accelerational flight is greater than that needed to merely sustain the aircraft, and it, therefore, is the determinent of how must total surface area the radial wings 4 must have. The preferred total surface area is such that the radial wings 4 may effect within a second or two an aerodynamic curving of all of the aircraft's accumulated annular motion into motion of translocational flight of the aircraft.

Short radial wings 4 are preferable for several reasons. One is that during the aircraft's accelerational flight the radial wings 4 must bear large aerodynamic loads, and that its easier to make a wing able to bear a large load when the wing is short.

Another is that a short radial wing 4 can perform more effectively and efficiently during the aircraft's accelerational flight. What matters here is the ratio of radial wing 4 length to aircraft radias, with a lower ratio enabling a better radial wing 4 performance, and a shorter radial wing 4 enables a lower ratio. A minimized ratio minimings the variation in attack angle occurring over a radial wing's 4 length during the accelerational flight and facilitates thereby a maintenance over the wing's full length of an effective and efficient attack angle.

A short radial wing 4 is preferable also because it enables during the aircraft's revolution about its longitudinal axis a relatively small ratio of radial wing 4 tip velocity to annular wing 1 annular velocity. A minimization of that ratio is preferable because it minimizes the likelihood that a limit upon attainable tip velocity will limit the possibility for attainment of annular wing 1 annular velocity and, thereby, the aircraft's capacities for accumulation of annular motion and for acceleration.

Since its desirable that radial wing 4 length be minimized its desirable also that the total surface area of the radial wings 4 be divided amongst as many radial wings 4 as practical. Division of the surface area amongst a relatively large number of relatively small wings permits a radial wing 4 that is both short and incorporating of a reasonable aspect ratio.

The preferred aircraft includes a means for collective control of radial wing 4 pitch, represented in FIG. 2 by an encircled "P". The radial wing 4 pitch control means preferrably is enclosed within the annular wing 1. The pitch control means preferably is constructed such as to be able to vary radial wing 4 pitch through a range encompassing of at least 90° of arc and extending at least from a pitch that omits the radial wing 4 chordlines normally to the aircraft longitudinal axis to a pitch that parallels the chordlines with the aircraft longitudinal axis and directs the radial wing 4 leading edges toward the aircraft's fore.

One ordinary skill in the arts relating to the making of pitch control systems is such that persons of ordinary skill who've been apprised of a need to control pitch collectively through a described range may with ordinary skill make an appropriate means. Accordingly, a detail description of the structure of the radial wing 4 pitch control means won't be provided.

Each of the preferred aircraft's engines, represented in FIG. 1 by an encircled "E", preferably is an axial flow turbojet. Preferably, each engine is secured rigidly to the annular wing 1 and to the annular spar, not shown, of the annular wing 1. Each engine's orientation is such that its longitudinal axis parallels the aircraft longitudinal axis, and such that its inlet and its exhaust are directed, respectively, toward the aircraft's fore and aft.

The parallelness between the engine and aircraft longitudinal axes is provided so that the aircraft may revolve about its longitudinal axis without reorienting the spin axes of the engines' turbines. That lets the aircraft's revolution occur without creation of the gyroscopic reactional forces that would result from reorientation of the engine turbine axes.

The engine inlets preferably are shaped such as to enable effective and efficient intake of air during all of the various phases of the aircraft's operation. One inlet shapes are not a part of the present invention, and the level of ordinary skill in the arts relating to shaping of inlets is such that persons who've been apprised of what the engines must accomplish may with ordinary skill render appropriately shaped inlets. Accordingly, a detail description of inlet shape won't be provided. A description of the engine operations is provided within the detail description of the aircraft's operation.

Preferably, the engines are distributed equidistantly from one another through the annular length of the annular wing 1. In the aircraft illustrated in FIG. 1, there are two engines; accordingly, they're positioned at diametrically opposed areas of the annular wing 1.

Given the orientations of the engines, each's unvectored thrust is directed such as to propel the aircraft forwardly and along its longitudinal axis. The thrusts therefore must be vectored before they can effect revolution of the aircraft about its longitudinal axis.

A vectoring unit, represented in FIG. 1 by a "V" enclosed by a partial circle, therefore is secured to and associated with each engine. The vectoring unit is constructed and oriented such that its vectoring of thrust is about an axis that transits the vectoring unit and is radial with aspect to the aircraft longitudinal axis. The unit's construction is such that it may vector its associated engine's thrust by at least 90° about the axis just described.

Given the vectoring's just described form, when a vectoring unit is most fully vectoring its associated engine's thrust the thrust is directed tangentially with respect to the annulus that the annular wing 1 composes. The thrusts when fully vectored therefore effect revolution of the aircraft about its longitudinal axis.

An engine-vectoring unit combination wherein the vectoring unit can vector the engine's thrust by up to 90° about an axis thats normal to the engine longitudinal axis and transiting of the vectoring unit is in use in the prior art and adaptable to performance of the function that the present aircraft's engine-vectoring unit must perform. Accordingly, detail description of the structures of the engine and the vectoring unit won't be provided here.

The aircraft includes a means for controlling the operation of the vectoring units. The means' construction is such that the vectoring units function synchronously; the degree of each unit's vectoring at any time equals the degree of the other unit's vectoring at that time.

The means for controlling vectoring unit operation in constructed also such that its control of the vectoring is such that the angular quantity of vectoring at any time equals the then present angular quantity of variation of radial wing 4 chordlines from parallels of the aircraft longitudinal axis. For instance, when the radial wings 4 are pitched such that their chordlines parallel the aircraft longitudinal axis the angular quantity of vectoring of engine thrust is zero; when the radial wing 4 chordlines are oriented normally to the aircraft longitudinal axis the angular quantity of the vectoring of thrust is 90°; when radial wing 4 pitch is halfway between the two pitches just described the quantity of the thrust vectoring is 45°; and so forth.

The level of skill in the arts relating to the making of means for controlling vectoring of engine thrusts in such that a means for effecting the vectoring control just described may be made with ordinary skill. Accordingly, a detail description of the structure of the means for controlling operation of the vectoring units won't be provided. Description of some of the vectoring thats done during the aircraft's operation is provided within the description of the aircraft's operation provided later herein.

Each aileron 5 is a portion of the trailing area of the annular wing 1. Each aileron 5 is constructed and is attached to the rest of the annular wing 1 in such a way that its pitch adjustable relative to the area of annular wing 1 proximate to it. Accordingly, each aileron 5 is an aileron of a sort typical of a prior art aileron of a straight wing except that its an aileron of an annular wing. Each aileron 5 is secured at its fore area to the annular wing 1, and the attachment is such as to permit aileron pitch adjustability about an axis thats approximately tangential to the arc of the area of the annular wing 1 within which the aileron 5 resides.

Preferably the ailerons 5 are distributed equidistantly from one another through the annular length of the annular wing 1 trailing area. If for instance the ailerons 5 number four they're spaced at 90° intervals. The aileron positioning preferably is such that no aileron 5 occuppies an area occuppied by an engine-vectoring unit combination.

The aircraft includes means, not shown, for controlling aileron 5 operation. Preferably, the means construction is such as to enable independent operation of each aileron 5, in other words, such as to permit pitching of an aileron 5 without simultaneous pitching of another aileron.

The level of ordinary skill in the arts relating to the making of ailerons and means for controlling them is such that ailerons and aileron controlling means capable performing as just described may be made with ordinary skill. Accordingly, a detail description of the structure of the ailerons 5 and of the means for controlling them won't be provided herein. Further description of aileron operation is provided within the description of aircraft operation provided later within this specification.

The preferred aircraft includes a landing gear, not shown. The hear's construction is such that it and the ground beneath it may sustain the aircraft while the aircraft is oriented such that its longitudinal axis is oriented vertically and while the aircraft revolves about its longitudinal axis. The preferred gear comprises three strut-wheel combinations that are extendable from the annular wing 1. The extension is aftwardly with respect to the aircraft, and also downwardly when the aircraft longitudinal axis is oriented vertically. Secured to each strut's aftward, downward extremity is a wheel, and the wheel's attachment to the strut is such as to permit the wheel's rotatability about an axis thats radial with respect to the aircraft longitudinal axis. Rotation of the wheels about their axes of rotation accordingly enables a low friction interface between the ground and the aircraft when the aircraft is revolving about its longitudinal axis.

Preferably, the gear's three strut-wheel combinations are identical to one another and are distributed equidistantly from one another, and, therefore, at 120° intervals, along the annular length of the annular wing 1. Preferably, their placement is such that no strut-wheel combination is located coincidently with either an engine-vectoring unit combination or an aileron 5. The strut-wheel combinations preferably are constructed such as to be retractable into the annular wing 1.

The ordinary skill in the arts relating to the making of aircraft landing gears in such that a gear that will fit the above description can be made with ordinary skill. A detail description of the gear's structure therefore won't be provided.

The preferred aircraft's fuel tanks, two of which are represented in FIG. 2 each by an encircled "F", are enclosed within the annular wing 1. The tanks preferably are located an constructed such as to permit the fuel to be distributed as equally as is possible about the annular length of the annular wing 1, and to be distributed also such as to position the center of the fuel's mass coincidently with the aircraft longitudinal axis. The aircraft preferrably includes a means, not shown, for pumping fuel between tanks as needed to maintain a coincidence between fuel center of mass and aircraft longitudinal axis.

The level of ordinary skill in the arts relating to the making of fuel tanks and fuel pumping systems is such that tanks and a pumping system that will meet the above description can be made with ordinary skill. Accordingly, a detail description of the structures of the tanks and pumping system unit be provided herein.

Control of the preferred aircraft's flight preferably is by a pilot's operation of a transmitter-receiver-servo system, not shown, of a sort currently in use in controlling prior art aircraft. The pilot operates controls that are parts of the transmitter; the transmitter in response effects radio transmissions that correlate with the pilot's actions; the receiver receives the transmissions and generates outputs that correlate with them; the outputs from the receiver effect operations of servos, and the servo operations effect operations of the aircraft's elements; the overall result is operation of the aircraft's elements that correlates with the pilot's actions. The pilot and transmitter preferably are situated externally to the aircraft, and the receiver and servos are incorporated within the aircraft. The pilot preferably locates himself such that he may observe the aircraft and its responses to his actions. In the preferred aircraft servo operations that are responsive to pilot actions control radial wing 4 pitch, engine thrust quantity, degree of vectoring of thrust, aileron position, landing gear extension and retraction, and fuel distribution.

The ordinary skill in the arts relating to the making of aircraft-controlling transmitter-receiver-servo systems and to the connecting of them with the aircraft elements that they're to control is sufficient that a system that can control the operations of the preferred aircraft's elements can be made with ordinary skill. Accordingly, a detail description of the structure of the transmitter-receiver-servo system and of its connections with the elements that are to be controlled won't be provided herein. The operations of the aircraft's radial wings 4, engines, vectoring units, ailerons, and landing gear that are to be effected are described later herein within the detail description of the aircraft's operation.

The preferred aircraft is constructed such as to balance it optionally for optimal flight performance. The arrangement and the construction of the elements are such as to position the aircraft mass center appropriately relative to the center of the aerodynamic lift effected by the annular wing 1 during the aircraft's translocational flight. The arrangement and construction also is such as position the aircraft mass center substantially coincidently with the aircraft longitudinal axis. The arrangement and construction also is such as to position the aircraft mass center substantially coincidently with the center of the gyroscopic effect thats created during and by the aircraft's revolution about its longitudinal axis.

The radial wings 4 of the preferred aircraft are arranged with respect to the rest of the aircraft such as to position the center of the aerodynamic lift thats effected by them during revolution of the aircraft about its longitudinal axis substantially coincidently with the center of the gyroscopic effect thats effected during and by such revolution, to minimize the lift's tendency to process the aircraft longitudinal axis.

In the preferred aircraft all elements are arranged and constructed such as to reside within the annulus that the aircraft composes, where by their annular motion during the aircraft's revolution about its longitudinal axis they may contribute to the aircraft's accumulation of annular motion. Placement of elements elsewhere would reduce the aircraft's capacity for accumulating annular motion, and thereby, its accelerational performance.

The preferred aircraft's elements are constructed and arranged such as to distribute the aircraft's mass as evenly as is practical through the annular length of the annulus that the aircraft composes. That minimizes forces that during revolution of the aircraft about its longitudinal axis tend to distort the aircraft's shape from the preferred perfectly annular.

The aircraft at ground rest in oriented such that its longitudinal axis is oriented vertically. A flight operation accordingly is initiated with the aircraft so oriented.

Flight operation is commenced with a starting of the engines. Then, simultaneously, the radial wings 4 are pitched to horizontal and the engine thrusts are vectored to tangents to the aircraft annulus. The pitching and vectoring occur synchronously and simultaneously due to the earlier described interaction between the pitching and the vectoring control means.

The engine thrusts then are maximized. The thrusts, vectored as they are, effect revolution of the aircraft bout its longitudinal axis. When the rate of the revolution is sufficient that radial wing 4 annular velocity is sufficient that the radial wings 4 may effect enough aerodynamic lift to sustain the aircraft, the radial wings 4 are pitched upwardly just enough to cause them to effect enough lift to raise the aircraft slowly from the ground. As soon as the aircraft has become airborne the landing gear is retracted into the annular wing 1.

The engine thrusts are permitted to accelerate the aircraft's revolution to its maximum safely attainable rate. During the increase in the rate of revolution the radial wings 4 are kept pitched such as to effect just enough lift to keep the aircraft rising slowly, and the engine thrusts are kept vectored almost to tangents to the annular wing 1. So pitched the radial wings 4 effect little drag, and so vectored the engine thrusts apply themselves almost entirely to the acceleration of the aircraft's revolution, and the acceleration of revolution accordingly proceeds expeditiously.

As the aircraft's rise and acceleration of its revolution proceed, the aircraft longitudinal axis remains stably vertical. The gyroscopic effect created by the aircraft's revolution is large, and there's present little or no force of a sort that would effect precession of the aircraft longitudinal axis.

Gravitation doesn't effect such a force because it acts as if acting upon the aircraft mass center, and that center coincides with the center of the aircraft's gyroscopic effect. If the aircraft's rise is into calm air the center of the sustaining lift coincides with the center of the aircraft's gyroscopic effect and the left therefore doesn't effect precession of the aircraft longitudinal axis. If the lift off is into a wind, the relative motion between air mass and aircraft effects an offset of the lift center, and the lift resultingly may effect some precession. Such is the largeness of the gyroscopic effect, though, that unless the wind is strong the resulting precession is insufficient to effect more than a slight departure of aircraft longitudinal axis from the vertical.

When the rate of the aircraft's revolution has reached the maximum thats safely attainable, the aircraft may commence the most distinguishing of its operations, an acceleration of translocational velocity thats effected by transformation of the accumulated annular motion of aircraft revolution. The transformation is effected by an aerodynamic curving of the annular motion into a linear motion of translocational aircraft flight, and the aerodynamic curving is effected by an alteration of radial wing 4 pitch.

The transformation is initiated by pitching the radial wings 4 away from their initially nearly horizontal pitches and toward vertical pitches to such a degree as causes them to effect as much aerodynamic lift as they can at their airspeeds. The radial wing 4 pitch change typically is on the order of 15° or so.

The axes of the aerodynamic forces effected by the radial wings 4 at their new pitches are offset from the vertical in directions opposite to that of radial wing 4 annular motion by about 15°, and the forces therefore act partly vertically and partly contrarily to the aircraft's revolution. The aerodynamic action is of a deflective sort wherein the air mass is deflected downwardly and in the direction of the aircraft's revolution while the aircraft in equal and opposite reaction is deflected upwardly and contrarily to its revolution. The deflection of the air is, of course, in large part in a form of curving of air that happens as air passes across the radial wing 4 upper surfaces. The action is analogous to the sort of deflection that happen when a horizontally moving object strikes an upwardly inclined surface, and the aircraft, the horizontally moving object, is deflected upwardly while the Air, the inclined surface, is deflected oppositely. The aircraft wights much less than the air mass with which its interacting, so in the deflective aerodynamic action the aircraft retains most of its velocity.

As the aircraft's annular, horizontal motion transforms into linear, vertical motion, radial wing 4 attach angle declines away from that delivering of maximum aerodynamic force. The decline, however, is offset to elimination by increasing radial wing 4 pitch as needed to cause radial wing 4 attack angle to remain at that productive of maximum aerodynamic force.

The transformation of annular, horizontal motion into linear, vertical motion, and the responsive alteration of radial wing 4 pitch, is continued until radial wing 4 pitch is vertical, whereupon alteration of radial wing 4 pitch is halted. Radial wing 4 attack angle at arrival of radial wing 4 pitch at vertical is still positive and delivering of aerodynamic force, and positive attack angle and resulting transformation of annular, horizontal motion into linear, vertical motion continues until attack angle and annular, horizontal motion simultaneously reach zero.

The construction of the preferred aircraft is such that its ratio of radial wing 4 surface area to aircraft weight is sufficient that its radial wings 4 may effect enough aerodynamic force to effect the just described transformation within a time of two seconds or less. Such a ratio isn't difficult of attainment; wing area to weight ratios enabling of transformations of comparable amounts of horizontal motions into vertical motions within comparable times are attained in fixed wing aircraft. The ratio must of course be sufficient to offset inefficiencies of wing operation.

The preferred aircraft also is constructed such that the ratio of its engine thrust to aircraft weight is sufficient that during the transformation of annular, horizontal motion into linear, vertical motion the thrust and its accelerative effect may add enough motion to the aircraft to offset the losses of aircraft motion that result from transformation of it into motion of the air mass and into energy of aircraft elevation. Inasmuch as such a thrust to weight ratio has been attained in fixed wing aircraft its attainable in the present aircraft. The thrust vectoring effected during the aircraft's transformation is such as to let the thrusts act most effectively in offsetting the just described motion losses.

Once the motion transformation and associated acceleration has been completed the aircraft is flyable as a fixed annular flying wing aircraft, and preferably its then flown as such. Its fixed annular wing flight is like that envisioned of prior art annular wing aircraft except that its a flight of a flying annular wing rather than of an annular wing aircraft incorporating of a conventional fuselage and empennage.

Course control during the fixed annular wing flight is effected by deflections of one or more of the ailerons 5. A deflection of an aileron 5 trailing edge away from the aircraft longitudinal axis effects a turn of that axis toward the direction of the deflection. Current knowledge in the arts relating to control of course by aileron action is sufficient that a detail knowledge of how to control the aircraft by actions of its ailerons 5 is attainable with exercise of ordinary skill. A detail description of the same accordingly won't be provided.

During the fixed annular wing flight minute adjustments of radial wing 4 pitch may be used to keep annular wing 1 roll attitude constant. A constant annular wing 1 roll attitude effects a constancy of aileron 5 position relative to the aircraft longitudinal axis, and thereby lets the pilot know continually where each aileron 5 is relative to the aircraft longitudinal axis and what result a deflection of any aileron 5 will have. An alteration of an annular flying wing's course of course requires no alteration of roll attitude.

The fixed wing flight typically includes a turn of the aircraft longitudinal axis away from the vertical and to the horizontal, then a horizontal flight to desired destinations. The turn to the horizontal should be effected before the aircraft has reached its maximum operating altitude and, if the aircraft is unable to maintain a constant velocity during vertical flight, before its vertical velocity has fallen too far.

A landing can be done by commencing a vertical fixed wing flight, then doing a reverse of the earlier described transformational flight, to put the aircraft into a revolutionary flight wherein its longitudinal axis is oriented vertically, then letting the aircraft descend while within the latter flight to a landing. The descent may be effected and controlled with appropriate control of radial wing 4 pitch and of aircraft annular velocity. Inasmuch as the preferred aircraft doesn't include a means for thrusting the aircraft laterally to its longitudinal axis, the descent should be made to a landing upon a large, open, flat area. The ordinary skill in the appropriate arts is sufficient that a detail picture of a landing operation of the sort just described may be envisioned with exercise of ordinary skill, so further description of the landing phase unit be provided.

Construction of versions of the aircraft that may be occuppied and piloted by a person or persons is envisioned. Such versions preferably will be large enough and heavy enough that the weight of crew and crew area will compose but a small fraction of the weight of the full aircraft. That'll be because the crew and their area will be kept free of the annular motion that happens during the aircraft's accumulation of annular motion, and because weight that doesn't contribute to the accumulation of annular motion impedes the aircraft's accelerational performance, and impedes it to a degree thats a function of the ratio of noncontributing weight to overall aircraft weight. If the weight of crew and crew area is kept to less than 10% of that of the full aircraft the aircraft will be able to accelerate impressively.

A crew area typically will include a cockpit situated within the area of the aircraft longitudinal axis. A plurality of spokes extending from crew area to annulus can be used to secure the crew area to the rest of the aircraft, and the spokes can be secured to the annulus with bearing means that permit the spokes to remain stationary while the annulus revolves about them and the crew area. Satisfactory bearing means may be constructed with ordinary skill.

Bearing means securing such spokes to the annulus are unlikely to be fully free of friction, and bearing friction will tend to transfer a small part annulus motion to spokes and crew area. Accordingly, a crew carrying version of the sort just described will include a means for offsetting the crew area and spokes' tendency to revolve with the annulus. The rotational torgues to be offset, being only those resulting from bearing friction, will be small, and a means for offsetting them can be made with use of ordinary skill.

It is claimed:

1. An aircraft comprising:

at least one means for sustaining said aircraft;

at least one means for controlling the course of the translocational motion of said aircraft as a whole;

at least one means for accumulating within said aircraft motion which is of a form other than that of translocational motion of said aircraft as a whole;

at least one means for transforming said motion which is of a form other than that of translocational motion of said aircraft as a whole into motion which is of the form of said translocational motion of said aircraft as a whole;

wherein said aircraft is structured, as a whole, generally, particularly, purposefully, in the arrangements relative to one another of the principle elements of said aircraft, and in the provisions for the operation of said principle elements of said aircraft, to provide for, facilitate, augment, increase, and maximize the capacity of said aircraft to increase the rate of said translocational motion of said aircraft by the means of transforming said motion which is of a form other than that of translocational motion of said aircraft as a whole into motion which is of the form of said translocational motion of said aircraft as a whole.

2. The aircraft of claim 1 wherein:

said at least one means for accumulating within said aircraft motion which is of a form other than that of translocational motion of said aircraft as a whole accumulates motion which is generally and principly of the form of orbital motion of at least one element of said aircraft.

3. The aircraft of claim 1 wherein:

said at least one means for transforming said motion which is of a form other than that of translocational motion of said aircraft as a whole into motion which is of the form of said translocational motion of said aircraft as a whole generally and principly transforms motion which is generally and principly of the form of orbital motion of at least one element of said aircraft into motion which generally and principly of the form of translocational motion of said aircraft as a whole.

4. The aircraft of claim 1 wherein:

said at least one means for accumulating within said aircraft motion which is of a form other than that of translocational motion of said aircraft as a whole consists principly of at least one rotatably element;

substantially all of such elements of said aircraft as can be structured such as to withstand a rotational environment and to perform their necessary functions while situated within a rotatable environment are situated within said at least one rotatable element end within the perimetrical area thereof;

said at least one rotatable element is as a whole structured generally, a particularly, purposefully; in the arrangements relative to one another of the principle elements of said at least one rotatable element, and in the provisions for the operations of said principle elements of said at least one rotatable element, to provide for, facilitate, augment, increase, and maximize the capacity of said at least one rotatable element for accumulating motion that is of the form of rotation of said at least one rotatable element.

5. The aircraft of claim 4 wherein such elements of said aircraft as are situated within said at least one rotatable element and within the perimetrical area thereof include the following:

the primary at least one means for sustaining said aircraft;

the primary at least one means for transforming said motion which is of a form other than that of translocational motion of said aircraft as a whole into motion which is of the form of said translocational motion of said aircraft as a whole;

the primary at least one means, if any such at least one means be present within said aircraft, for imparting motion into the structure of said aircraft;

the primary at least one means for containing the supply of fuel used for the operation of said at least one means for imparting motion into the structure of said aircraft, if any such said at least one means for imparting motion into the structure of said aircraft, and any such said at least one means for containing said supply of fuel, are present within said aircraft.

6. The aircraft of claim 4 wherein:

said aircraft incorporates at least one primary means for imparting motion into the structure of said aircraft;

said at least one primary means for imparting motion into the structure of said aircraft is situated within said at least one rotatable element and within the perimetrical area thereof;

said at least one primary means for imparting motion into the structure of said aircraft incorporates at least one element which rotates as a part of the operation of said at least one primary means for imparting motion into the structure of said aircraft;

the axes of rotation of substantially all of the elements which rotate as a part of the operation of said at least one primary means for imparting motion into the structure of said aircraft substantially parallel the axis of rotation of said at least one rotatable element.

7. The aircraft of claim 1 wherein said at least one means for transforming said motion which is of a form other than that of translocational motion of said aircraft as a whole into motion which is of the form of said translocational motion of said aircraft as a whole comprises principly at least one means for aerodynamically transforming motion which is generally and principly of the form of orbited motion of at least one element of said aircraft into motion which is generally and principly of the form of translocational motion of said aircraft as a whole.

* * * * *